United States Patent [19]

Shaklee et al.

[11] Patent Number: 5,165,073
[45] Date of Patent: Nov. 17, 1992

[54] FACSIMILE APPARATUS FOR PRODUCING VARIABLE SIZE AND RESOLUTION IMAGES ON A REPRODUCTION MEDIUM

[75] Inventors: Kerry L. Shaklee, Brighton; Alvin R. Rothe, Jr., Littleton, both of Colo.

[73] Assignee: Honeywell, Inc., Minneapolis, Minn.

[21] Appl. No.: 519,051

[22] Filed: May 4, 1990

[51] Int. Cl.$^5$ .......................... H04N 5/76; G01D 9/02
[52] U.S. Cl. .................. 358/451; 346/110 R; 358/302
[58] Field of Search .............. 358/451, 302, 444, 445, 358/447; 346/110 R

[56] References Cited

U.S. PATENT DOCUMENTS

| | | | |
|---|---|---|---|
| 3,005,042 | 4/1958 | Horsley . | |
| 3,700,955 | 10/1972 | Lowe | 315/20 |
| 4,095,235 | 6/1978 | Quarton et al. | 346/110 R |
| 4,172,259 | 10/1979 | Lowe | 346/110 R |
| 4,309,720 | 1/1982 | Denham . | |
| 4,412,230 | 10/1983 | Goldberg | 346/110 R |
| 4,499,501 | 2/1985 | Eriksen et al. | 358/302 |
| 4,670,778 | 6/1987 | Miyakawa | 358/75 |
| 4,769,715 | 9/1988 | Feldman et al. | 346/110 R |
| 4,792,733 | 12/1988 | Redfern | 315/386 |
| 4,912,566 | 3/1990 | Tasaka | 358/302 |
| 4,952,923 | 8/1990 | Tamura | 358/451 |

FOREIGN PATENT DOCUMENTS 1478130  6/1977  United Kingdom .

Primary Examiner—Edward L. Coles, Sr.
Assistant Examiner—Jill Jackson
Attorney, Agent, or Firm—Merchant, Gould, Smith, Edell, Welter & Schmidt

[57] ABSTRACT

A facsimile system which produces variable resolution and size images on a reproduction medium is disclosed. A timing means produces two signals which control resolution in a first direction. The first signal controls release of pixels from a memory buffer to modulate the beam intensity of a cathode ray tube while the second signal controls the sweep in the first direction of the electron beam of the CRT. Resolution and size in a second direction is controlled by repeating lines of image data until the desired resolution is achieved. Hardware savings in the facsimile can be achieved by connecting a direct memory access controller to a graphics microprocessor through the host post of the graphics microprocessor and by using alternating banks of memory for storage of image data.

9 Claims, 12 Drawing Sheets

PIXELS

| 1A | 1B | 1C | 1D | 1E | 1F | 1G | 1H | 1I | 1J |
|----|----|----|----|----|----|----|----|----|----|
| 2A | 2B | 2C | 2D | 2E | 2F | 2G | 2H | 2I | 2J |
| 3A | 3B | 3C | 3D | 3E | 3F | 3G | 3H | 3I | 3J |
| 4A | 4B | 4C | 4D | 4E | 4F | 4G | 4H | 4I | 4J |
| 5A | 5B | 5C | 5D | 5E | 5F | 5G | 5H | 5I | 5J |
| 6A | 6B | 6C | 6D | 6E | 6F | 6G | 6H | 6I | 6J |
| 7A | 7B | 7C | 7D | 7E | 7F | 7G | 7H | 7I | 7J |
| 8A | 8B | 8C | 8D | 8E | 8F | 8G | 8H | 8I | 8J |
| 9A | 9B | 9C | 9D | 9E | 9F | 9G | 9H | 9I | 9J |
| 10A | 10B | 10C | 10D | 10E | 10F | 10G | 10H | 10I | 10J |

IMAGE 1
Fig. 4a

PIXELS

| 1A | 1A | 1B | 1B | 1C | 1C | 1D | 1D | 1E | 1E |
|----|----|----|----|----|----|----|----|----|----|
| 1A | 1A | 1B | 1B | 1C | 1C | 1D | 1D | 1E | 1E |
| 2A | 2A | 2B | 2B | 2C | 2C | 2D | 2D | 2E | 2E |
| 2A | 2A | 2B | 2B | 2C | 2C | 2D | 2D | 2E | 2E |
| 3A | 3A | 3B | 3B | 3C | 3C | 3D | 3D | 3E | 3E |
| 3A | 3A | 3B | 3B | 3C | 3C | 3D | 3D | 3E | 3E |
| 4A | 4A | 4B | 4B | 4C | 4C | 4D | 4D | 4E | 4E |
| 4A | 4A | 4B | 4B | 4C | 4C | 4D | 4D | 4E | 4E |
| 5A | 5A | 5B | 5B | 5C | 5C | 5D | 5D | 5E | 5E |
| 5A | 5A | 5B | 5B | 5C | 5C | 5D | 5D | 5E | 5E |

IMAGE 2
Fig. 4b

PIXELS

| 1A | 1A | 1B | 1B | 1C | 1C | 1D | 1D | 1E | 1E |
|----|----|----|----|----|----|----|----|----|----|
| 2A | 2A | 2B | 2B | 2C | 2C | 2D | 2D | 2E | 2E |
| 3A | 3A | 3B | 3B | 3C | 3C | 3D | 3D | 3E | 3E |
| 4A | 4A | 4B | 4B | 4C | 4C | 4D | 4D | 4E | 4E |
| 5A | 5A | 5B | 5B | 5C | 5C | 5D | 5D | 5E | 5E |
| 6A | 6A | 6B | 6B | 6C | 6C | 6D | 6D | 6E | 6E |
| 7A | 7A | 7B | 7B | 7C | 7C | 7D | 7D | 7E | 7E |
| 8A | 8A | 8B | 8B | 8C | 8C | 8D | 8D | 8E | 8E |
| 9A | 9A | 9B | 9B | 9C | 9C | 9D | 9D | 9E | 9E |
| 10A | 10A | 10B | 10B | 10C | 10C | 10D | 10D | 10E | 10E |

IMAGE 3
Fig. 4c

Fig. 4d

IMAGE 1

|   |   |   |   |   |   |   |   |   |   |   |   |   |
|---|---|---|---|---|---|---|---|---|---|---|---|---|
| 1A | 1B | 1C | 1D | 1E | 1F | 1G | 1H | 1I | 1J | 1J |
| 1A | 1B | 1C | 1D | 1E | 1F | 1G | 1H | 1I | 1J | 1J |
| 2A | 2B | 2C | 2D | 2E | 2F | 2G | 2H | 2I | 2J | 2J |
| 2A | 2B | 2C | 2D | 2E | 2F | 2G | 2H | 2I | 2J | 2J |
| 3A | 3B | 3C | 3D | 3E | 3F | 3G | 3H | 3I | 3J | 3J |
| 3A | 3B | 3C | 3D | 3E | 3F | 3G | 3H | 3I | 3J | 3J |
| 4A | 4B | 4C | 4D | 4E | 4F | 4G | 4H | 4I | 4J | 4J |
| 4A | 4B | 4C | 4D | 4E | 4F | 4G | 4H | 4I | 4J | 4J |
| 5A | 5B | 5C | 5D | 5E | 5F | 5G | 5H | 5I | 5J | 5J |
| 5A | 5B | 5C | 5D | 5E | 5F | 5G | 5H | 5I | 5J | 5J |
| 6A | 6B | 6C | 6D | 6E | 6F | 6G | 6H | 6I | 6J | 6J |
| 6A | 6B | 6C | 6D | 6E | 6F | 6G | 6H | 6I | 6J | 6J |
| 7A | 7B | 7C | 7D | 7E | 7F | 7G | 7H | 7I | 7J | 7J |
| 7A | 7B | 7C | 7D | 7E | 7F | 7G | 7H | 7I | 7J | 7J |
| 8A | 8B | 8C | 8D | 8E | 8F | 8G | 8H | 8I | 8J | 8J |
| 8A | 8B | 8C | 8D | 8E | 8F | 8G | 8H | 8I | 8J | 8J |
| 9A | 9B | 9C | 9D | 9E | 9F | 9G | 9H | 9I | 9J | 9J |
| 9A | 9B | 9C | 9D | 9E | 9F | 9G | 9H | 9I | 9J | 9J |
| 10A | 10B | 10C | 10D | 10E | 10F | 10G | 10H | 10I | 10J | 10J |
| 10A | 10B | 10C | 10D | 10E | 10F | 10G | 10H | 10I | 10J | 10J |

PIXELS 2"

LINES 2"

FACSIMILE APPARATUS FOR PRODUCING VARIABLE SIZE AND RESOLUTION IMAGES ON A REPRODUCTION MEDIUM

BACKGROUND OF THE INVENTION

This invention is directed toward the field of facsimile machines and more particularly is directed toward the field of facsimile machines which employ a cathode ray tube to record an image on a photo sensitive medium.

Systems which record image data into a permanent form are well known in the art. To form a permanent record of an image, the image data is presented on a cathode ray tube (CRT) in close proximity to a reproduction medium such as photographic film or dry silver reproducing paper. The full image is then projected onto the reproduction medium essentially at once. The reproduction medium may be further processed by heating or treatment with chemicals. However, because the full image is projected as a unit onto the reproduction medium, this method of recording requires large amounts of memory due to the amount of data that needs to be stored and transferred at any given time.

Thus, systems which produced only one line of a larger video image were developed. U.S. Pat. No. 4,309,720 (Denham) shows such a system. A full image is broken up into a plurality of lines, each line further being broken into separate color components. Then, the separate color components of a plurality of different lines are sequentially presented at a CRT. The CRT has a red phosphor, a green phosphor, and a blue phosphor, which are capable of displaying only a portion of the larger video image. After one color component each of a plurality of lines has been sequentially displayed on the CRT face, the reproduction medium is moved so that a new plurality of color components of a plurality of lines can be presented to the CRT face and these new components will be exposed on an area of the reproduction medium not previously exposed to those components. Yet, it is desirable to have a system where the size and resolution of the recorded image are variable.

SUMMARY OF THE INVENTION

The present invention is a color facsimile machine which is capable of producing variable resolution and size images on a reproduction medium. This is accomplished by timing the release of image data from a memory means separately from the timing of a sweep of an electron beam produced by a display means. By varying the timing of the image data release, the sweep or both, resolution in a first direction is thereby affected. Resolution in a second direction can be altered by writing a line of image data on a variable number of adjacent lines on the reproduction medium. The present invention includes a means which calculates the number of times a single line of image data must be repeated in order to produce an image on the reproduction medium having a preselected size and resolution.

BRIEF DESCRIPTION OF THE DRAWINGS

FIG. 3b is a blow up of a portion of FIG. 3a.

FIGS. 4a, b, c and d represent sample images.

DETAILED DESCRIPTION OF THE DRAWINGS

For ease of discussion, definitions of terms used throughout this description will be provided. First, a pixel is the smallest informational element of an image. An exemplary pixel is shown as 1A in FIG. 4a. A line of image data includes 1 or more pixels such as pixels 1A-1J. An image is a collection of lines of image data.

Figure 2:
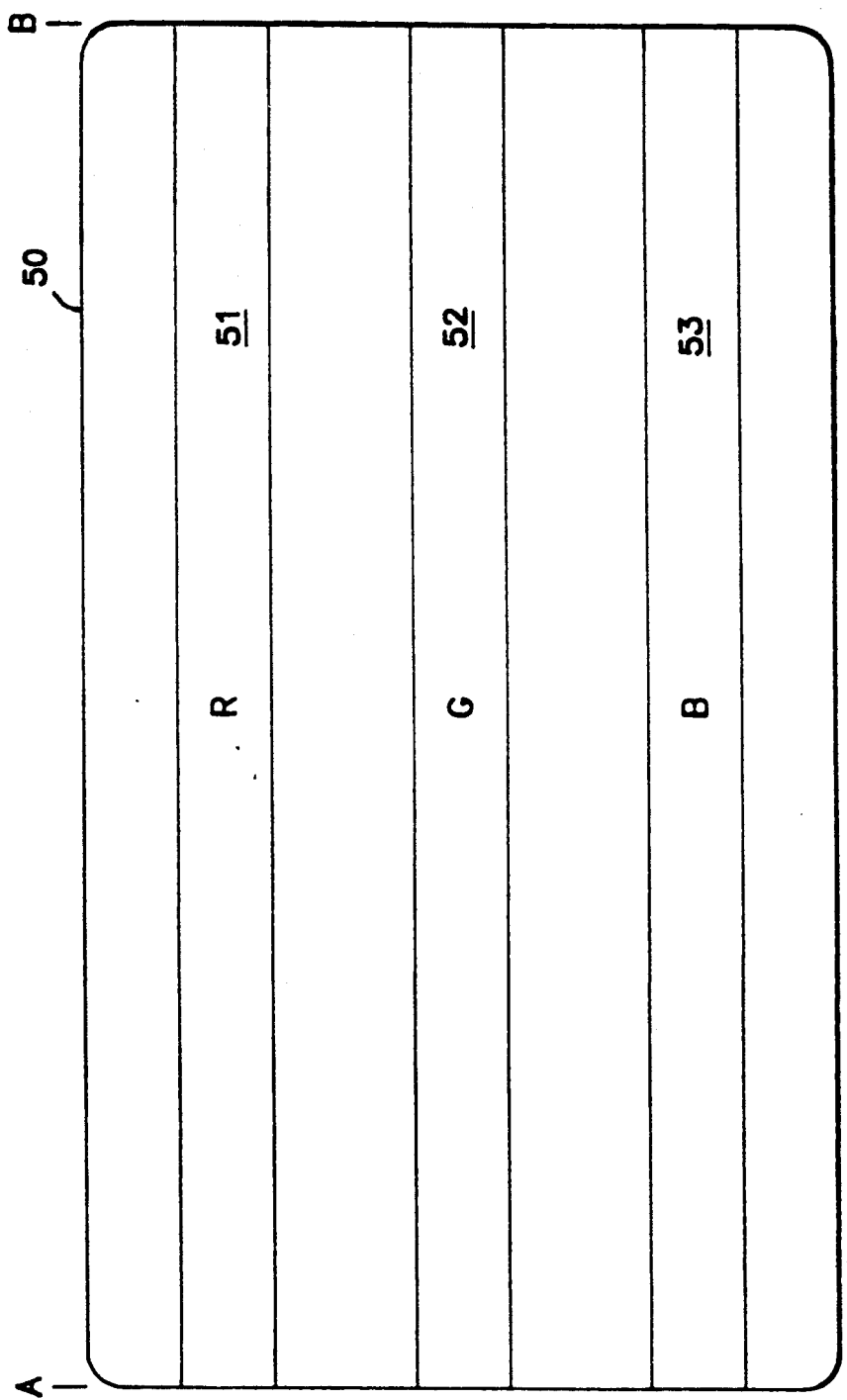
FIG. 2 is a front view of the display areas of the present CRT.

A track is the path traced by the electron beam along a phosphor or display area of a CRT. Phosphor bands labeled R, G and B are shown in FIG. 2.

Figure 4E:
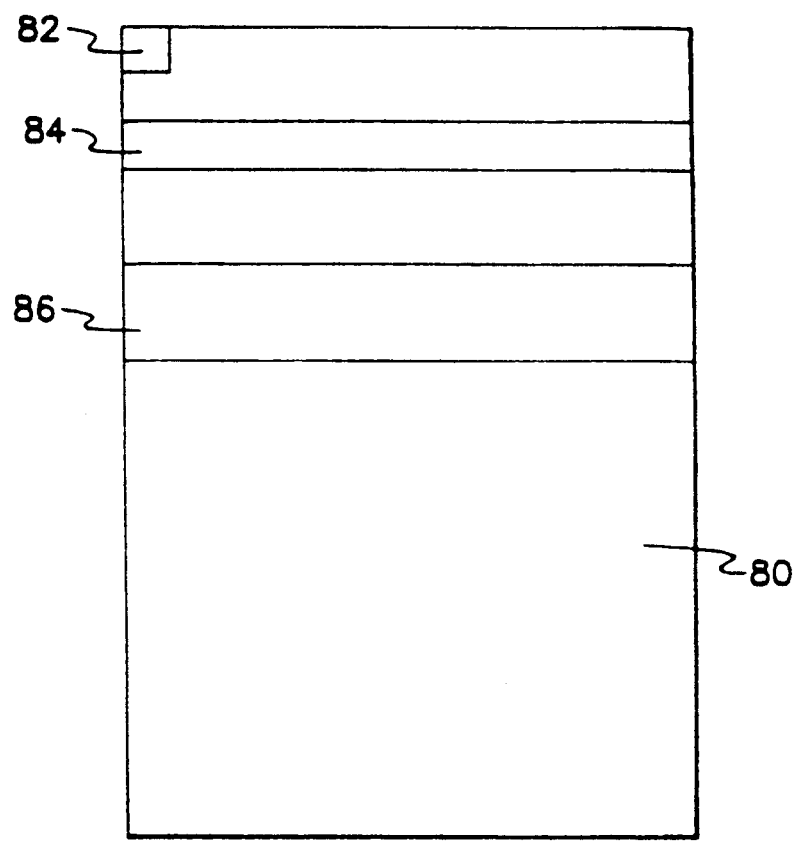
FIG. 4e is a sample reproduction medium.

The reproduction medium 80 in FIG. 4e can be divided up into smaller pieces as well. A vertical area 82 is adapted to receive a pixel such as 1A. The size of a vertical area is dependent upon electron beam width, and the composition of the medium. A line of the reproduction medium 84 is adapted to receive a line of image data such as 1A-1J. Finally, a section which have the same lines of image data recorded thereon.

Figure 1:
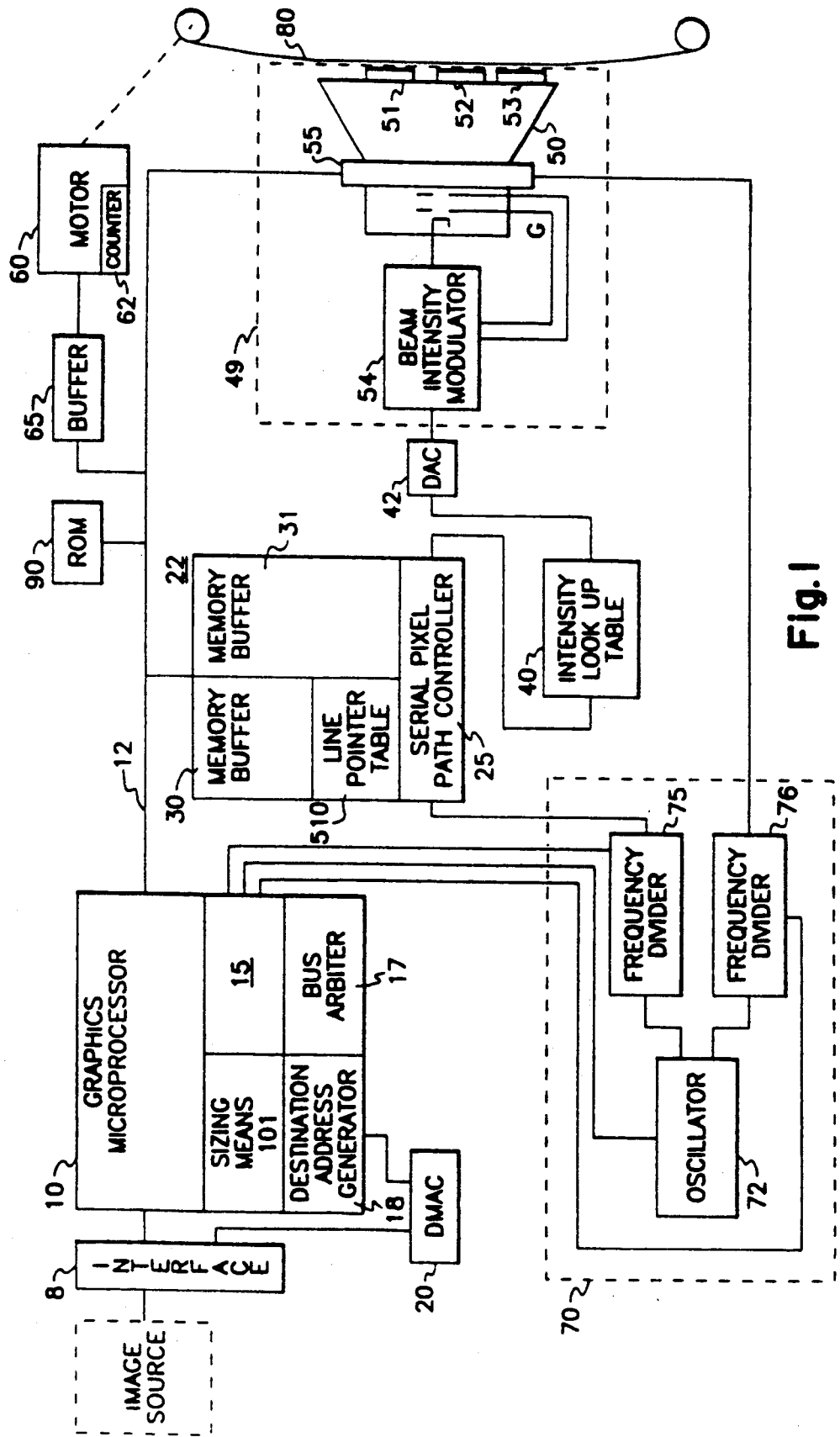
FIG. 1 is a block diagram of the present system.

Shown in FIG. 1 are the necessary elements to comprise the inventive system. An image source can be connected to the present system through an interface 8. The interface 8 is then connected to a microprocessor 10 and direct memory access controller (DMAC) 20. The microprocessor controls data flow, receives and executes instructions, and generally is responsible for operation of the complete system. In order to carry out its functions, the microprocessor 10 produces a number of signals which are used by other parts of the system. These signals will be described subsequently. Microprocessor 10 also has a host port 15 which includes bus arbiter 17 and destination address generator 18. The graphics microprocessor 10 is connected to DMAC 20 through bus arbiter 17 and destination address generator 18. An example of a graphics microprocessor which fits the above description is the Texas Instruments 34010 graphics microprocessor. The term graphics microprocessor will be used throughout the following description to describe a microprocessor which performs the above mentioned functions.

DMAC 20 acts as a traffic cop for image data flowing through the system. The DMAC senses when data is available at the image source for processing by the graphics microprocessor 10. Once the DMAC has sensed that data is available, it sends a signal to the graphics microprocessor that data must be received and stored. The bus arbiter then temporarily suspends other operations of the graphics microprocessor 10. Data is then passed through the graphics microprocessor onto a local bus 12 for storage in a random access memory (RAM) 22. The destination address generator 18 determines where in the RAM 22 the image data is stored, and which of a plurality memory buffer therein is to receive the data.

RAM or memory means 22 can include a serial pixel path controller 25 and two memory buffers 30, 31. Periodically, some of the data stored in memory buffers 30, 31 are alternately unloaded by shift registers (not shown) built into the buffers, and the data contained therein is sent to an intensity look up table 40. Serial pixel path controller 25 controls which of the shift registers of the memory buffers 30, 31 is to be unloaded after being initialized by the graphics microprocessor.

Intensity look up table 40 modifies the color data, in a color system, contained in the signal sent from the memory buffer, and sends pixel information to display exposure means 49, which may include a CRT 50. Note that the present invention may be made using a monochrome CRT. Once a full line of pixel data has been sent to CRT 50, stepper motor 60 moves reproduction medium 80 slightly so that a new line of pixels may be exposed on the paper without adversely affecting the lines previously exposed.

CRT 50 has one or more, here three, exposure areas 51, 52 and 53. After the pixel data has been modified by intensity look up table 40, it is sent to digital to analog converter (DAC) 42, then it is sent to beam intensity or exposure modulator 54. Beam intensity modulator 54 produces the signal which is sent to grid G for modulating the electron beam which strikes the phosphors. It is important to note that while the present embodiment is described as including three display areas, the present invention may be accomplished by using only one display area.

When the electron beam strikes one of the display areas 51, 52 and 53, light is thereby produced. The wavelength of the light produced can be controlled by careful selection of a phosphorescent material which is deposited onto the display areas. Another term for the display areas is phosphors.

It is to be noted that the present system may use other image exposure means such as a heat or pressure head which causes exposure of the reproduction medium by applying heat or pressure respectively. The amount of heat or pressure would be modulated by the pixel data, while control of the resolution and size could be performed in the same manner as is herein described.

The movement of the electron beam can be controlled by yoke 55 which is also called the exposure position controller. Yoke 55 receives signals which cause the electron beam to scan across display areas 51, 52 and 53 from, for example, A to B as shown in FIG. 2. This is called a horizontal deflection. This horizontal deflection sweep rate maybe set with a frequency divider 76 which divides the master clock oscillator 72.

A description of image data flow through the system will now be provided. For this discussion, the focus will be on how one line of pixels of the complete image is handled. Prior to the storage of any pixel information, the image source provides information to the graphics microprocessor on how many pixels are in each line of the image, how many lines there are in the image, and whether the image data will need to be reversed before printing. For some image sources, the image data may be received as the mirror image of the desired image. In such cases the image data must be rearranged before exposure on the medium, or the CRT electron beam must be deflected in the opposite direction from its normal deflection. The size and resolution information will be important in calculating the frequency of the signals leaving a first frequency divider 75 and determining how many times an individual line of pixels will be repeated on the reproduction medium to create an image with a selected aspect ratio.

After the image dimension information is provided to the graphics microprocessor 10, image data can then be stored in memory buffers 30, 31. When a pixel is ready to be transferred to the memory buffers, DMAC 20 sends a signal to the bus arbiter 17. Bus arbiter 17 then briefly suspends the graphics microprocessor from performing other functions. Destination address generator 18 decides where in the memory buffer the pixel should be stored. The address at which a pixel will be stored will depend upon whether the image being received must be rearranged to correct for the aforementioned mirror image problem. If there is no rearrangement necessary, the destination address generator will start at an address, x for example, and continue to load pixels at addresses which increment by one for each pixel. If there are w pixels to be stored, the last address will be x+w. If the image must be reversed, the destination address generator will start at x+w address and decrement one address for each pixel. The image source will provide a rearrange signal to the destination address generator if the image data must be rearranged. The graphics microprocessor then causes the pixel to pass through the graphics microprocessor to the address in the memory buffer specified by the destination address generator.

In a preferred embodiment, image lines are broken into 256 pixel groups. The graphics microprocessor loads one memory buffer with pixels until a complete group is stored. The graphics microprocessor, through the destination address generator causes the other memory buffer to store the next group of 256 pixels. This alternating process continues until the data for all of the pixels in a line are stores.

Once data for a complete line of pixels has been stored, the DMAC 20 causes the graphics microprocessor to pause, which in turn causes the destination address generator to select a new address in memory means 22 to receive a next line of pixels. This process is also repeated until all of the lines of pixel data in an image are stored.

The present system allows the resolution and size of the printed image to be varied both in the horizontal and vertical directions. In the horizontal direction, variable resolution and size are achieved by varying the rate at which pixel data is released to the CRT or by varying the horizontal sweep rate or by varying both. This in turn varies the pixel "size" in the horizontal direction. In the vertical direction, however, the only variable is the number of times a line of image data is exposed on the reproduction medium, and by varying the number of times a line of image data is exposed, vertical size and resolution are controlled.

Referring now to FIGS. 4a, b, c and d, thereshown are sample images wherein the numbers indicate the corresponding line from the image source, and the letters indicate pixels within a line. For ease of discussion, each box within the image represents a different addressable location on the reproduction medium.

In FIG. 4a, the resolution in both the vertical and horizontal direction is 10 lines per inch. Note that no pixel is repeated throughout the image.

Turning now to FIG. 4b, thereshown is a second image having a resolution of 5 lines per inch. Here, lines of pixels are displayed twice on the CRT to produce the repeated pattern. Note that less image data is present in this image. Four times as much information is used in printing image 1 as in image 2. In image 1, 100 different pixels are used (ten image lines at ten pixels each). In image 2, only 25 pixels form the image (five lines of five pixels).

It is also important to note that no data from the image source is lost when the size of the printed image or the resolution is changed. This can be shown by comparing FIGS. 4a and 4d. Both figures depict image 1, but FIG. 4d has a resolution of 5 lines per inch in both directions compared to the resolution in FIG. 4a of 10 lines per inch in both directions. Further, the images in both figures use pixels A-J of lines one through ten. However, in FIG. 4d, the smallest piece of image data (i.e., 1A) covers four times the area that the same piece of image data covers in FIG. 4a. As was stated earlier, the horizontal resolution will be controlled by the rate at which pixel information is released from the shift registers to the CRT and the rate of the horizontal sweep of the electron beam. In a preferred embodiment, horizontal sweep time remains constant while the rate at which pixels are released from memory varies with horizontal size and resolution.

In FIG. 4c, image 3 is shown having a horizontal resolution of 5 pixels per inch and a vertical resolution of 10 lines per inch. This is to show that horizontal and vertical resolution are independently controllable.

To create the proper vertical resolution, a line pointer table is set up before any image lines are projected onto the reproduction medium. The line pointer table is set up in RAM by a sizing means 101 in the graphics microprocessor 10. The sizing means 101 receives information on the number of vertical lines of the image, the desired resolution and the desired print size, then sets up a table based on an algorithm stored in ROM 90.

As an example, we will use the image of FIG. 4d. The user can select the vertical dimension, the horizontal dimension, the vertical resolution and the horizontal resolution, within limits. The main limitation is that resolution (R) is a function of image data (P for pixels, L for lines) and dimensions (x for horizontal, y for vertical) giving $$R_{vertical} = \frac{L}{y}$$

$$R_{horizontal} = \frac{P}{x}$$

After the size and resolution have been selected, the line pointer table must be set up so that the image may be reconstructed on the reproduction medium, having the user selected resolutions and dimensions. The method and apparatus for achieving the proper horizontal resolution and width has already been described with reference to oscillator 72, first frequency divider 75 and graphics microprocessor 10.

Figures 5A, 5B:
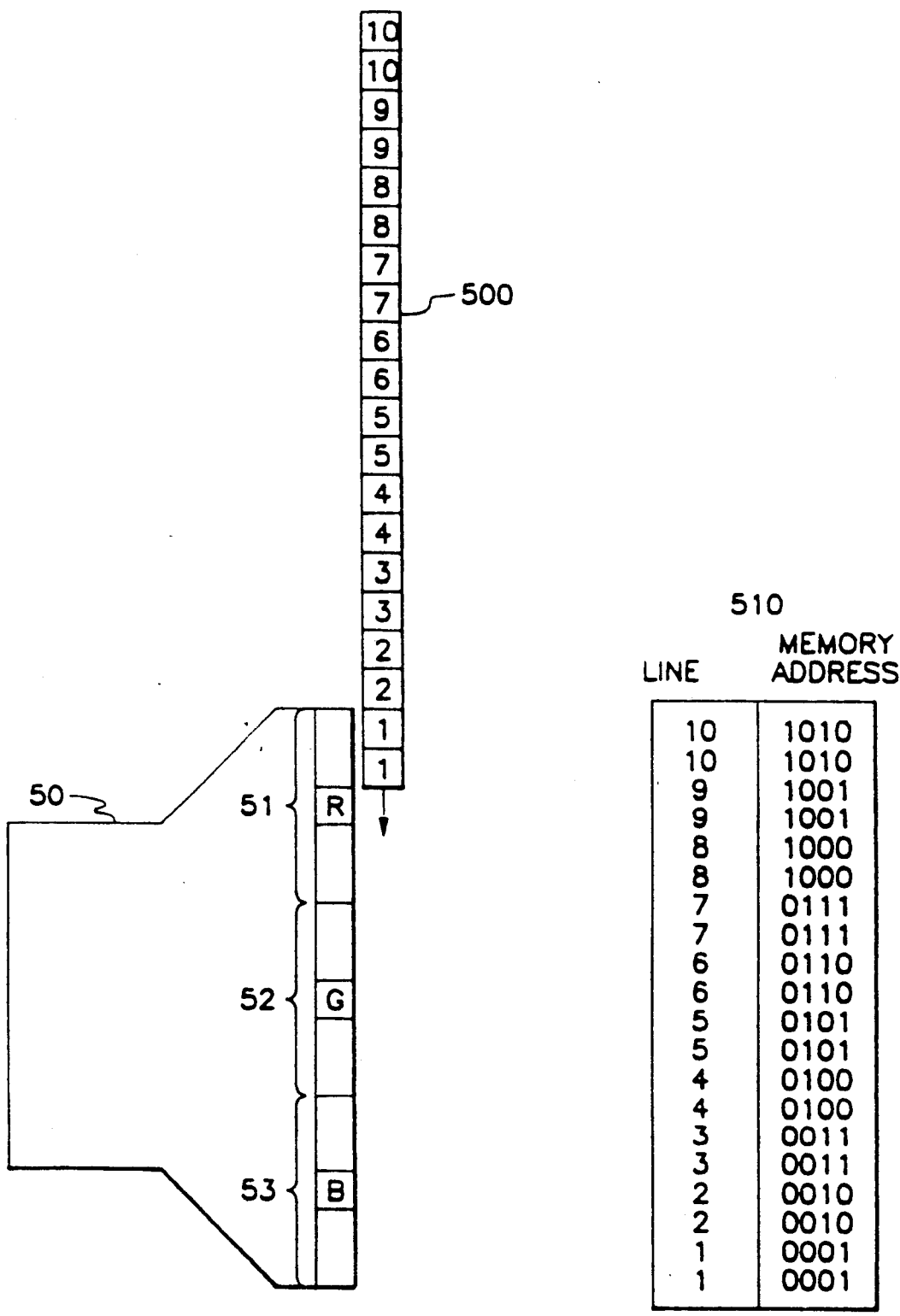
FIG. 5a shows a reproduction medium which is about to pass by a CRT, to be exposed.
FIG. 5b shows a sample line pointer table which may be employed in implementing the present system.

In FIG. 5a, a portion or sheet 500 of reproduction medium is shown ready to pass by CRT 50 to form an image thereon. As illustrated, sheet 500 has 20 different vertical positions on which lines of an image may be recorded. For this example, image 1 in FIG. 4d is being exposed to sheet 500. Image 1 in FIG. 4d has a vertical dimension of 2" and a vertical resolution of five sections per inch. The graphics microprocessor then calculates how many times a line of image data is to be repeated, by a simple division. Because there are ten lines to be displayed and 20 vertical areas to be recorded on the paper, each of the ten image data lines will need to be displayed twice onto adjacent vertical areas of sheet 500, as shown in FIG. 5a. Arrow E is used to show the direction of paper movement past the CRT.

Now that the number of times a line of image data needs to be repeated has been calculated, the line pointer table can be set up. This is done by the graphics microprocessor using instructions stored in ROM. The line pointer table identifies to the graphics microprocessor which line of image data needs to be sent to the CRT given the current paper position, and the next track of the CRT display areas to be hit by the electron beam. The line pointer table itself is stored in RAM.

Referring now to FIG. 5b, thereshown is an exemplary line pointer table 510 used in the present invention. This line pointer table lists the order of display of image data lines on the reproduction medium and a corresponding RAM address for the image data lines.

Figure 5C:
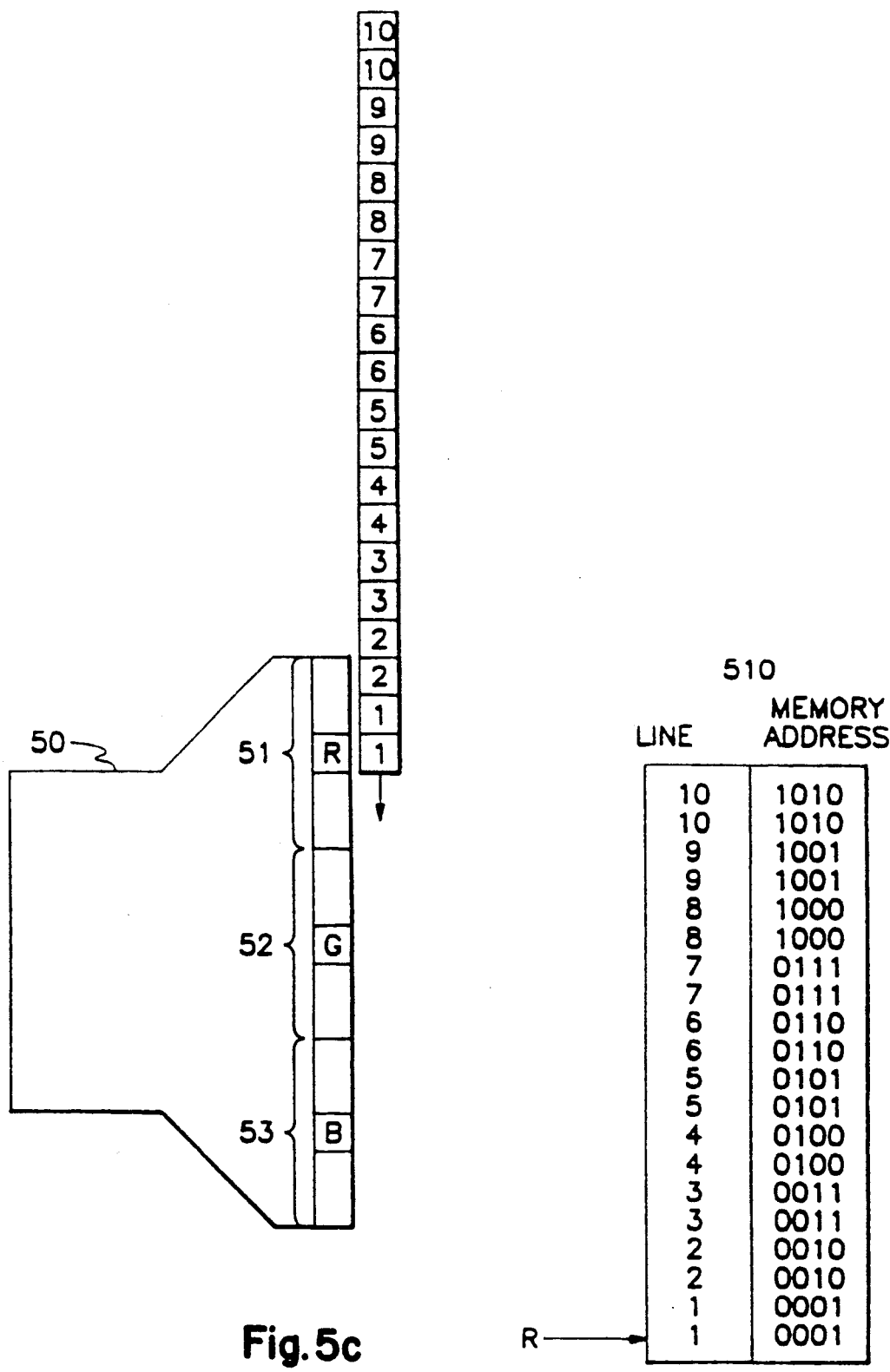
FIG. 5c-g show movement of the reproduction medium past the face of the CRT and the effect of the movement on the line pointer table.

In FIG. 5c, sheet 500 is beginning to pass by CRT 50. The CRT will alternate among tracks across the three phosphors, as to which tracks will be swept by the electron beam. Note that the tracks are identified by the letters R, G and B. The CRT, in the present embodiment, sweeps the red, then the green, then the blue track. First, the graphics microprocessor determines the current position of the sheet. This may be done through using a counter 62 to count the number of paper movements. If for example, the green band was about to be swept, the graphics microprocessor would know that the leading edge of the sheet 500 had not yet advanced to band G, and thus no pixel data need be released from memory 22.

Line pointer table 510 has three pointers, one each for the R, G and B tracks. These pointers identify the line of the sheet which is adjacent to the R, G and B tracks. The pointers are used to determine which line of image data should be transferred out of memory to the CRT.

In FIG. 5c, the first vertical area is the only one adjacent to the R track. Thus, line pointer table 510 shows the R pointer being located adjacent to the memory address for the data for image line 1. Thus, when the CRT performs its first Red-Green-Blue sweep, the graphics microprocessor will tell the RAM to release only the pixel information associated with line 1, stored at location 0001. There would be no pixel data sent to the CRT for the green and blue sweeps.

Figure 5D:
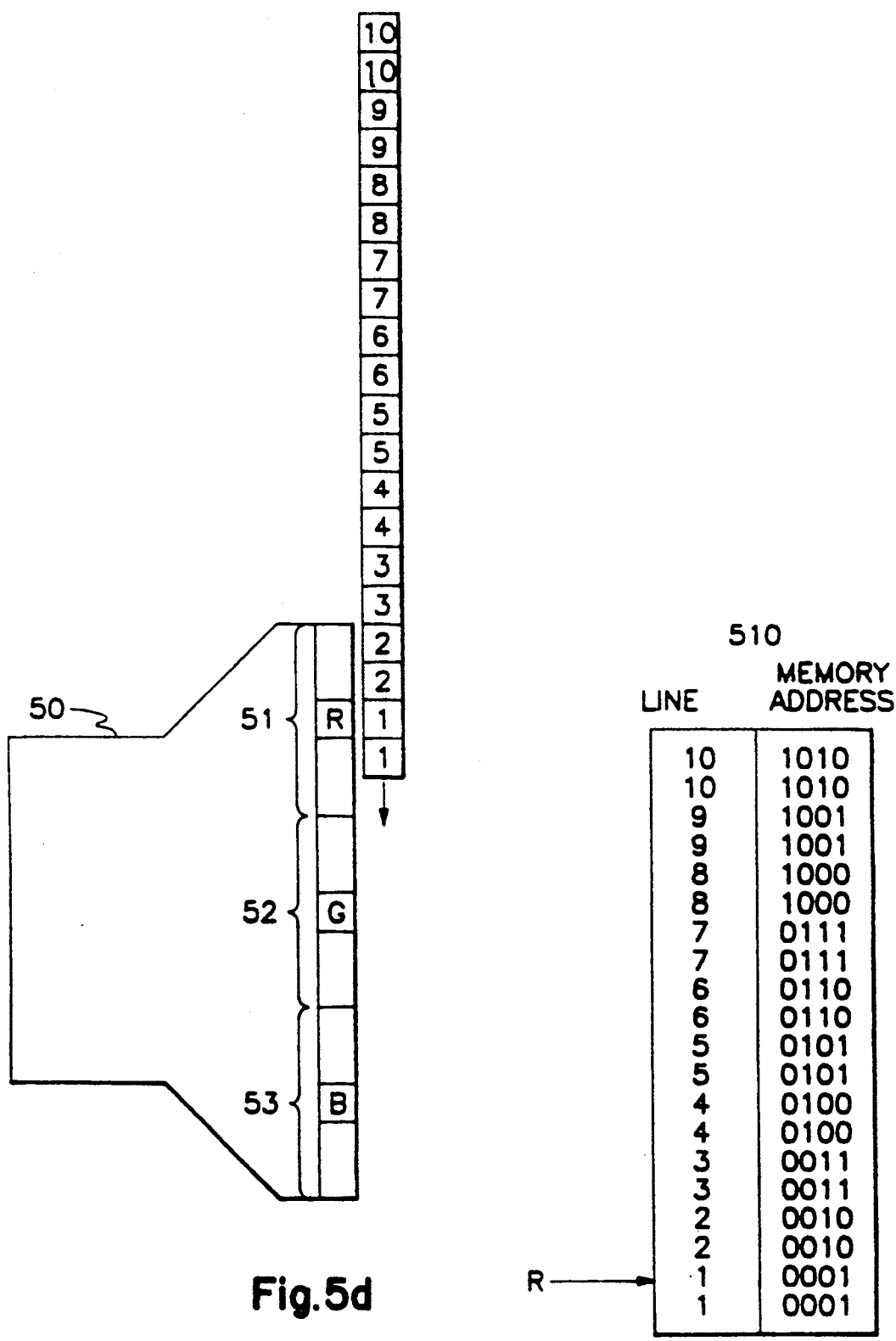

In FIG. 5d, the sheet 500 has moved one vertical area from its position in FIG. 5c. Note that the R pointer has moved one position also.

Figure 5E:
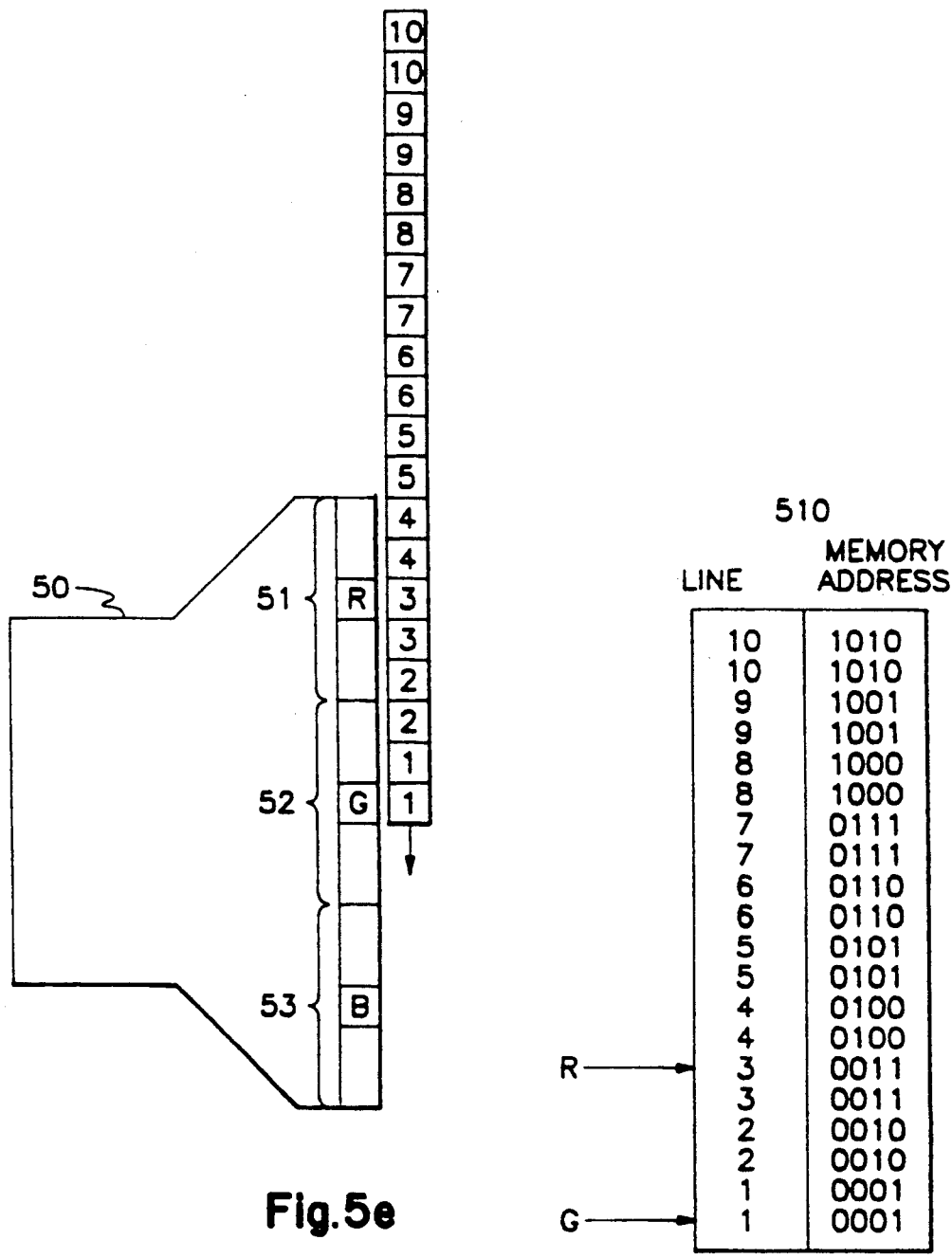

In FIG. 5e, the sheet 500 has advanced so that both the R and G tracks are now adjacent to a vertical area of the reproduction medium. Note that the R pointer has once again moved, and that the G pointer has now appeared, to show the proper line of pixels to be released during the sweep of the green phosphor.

Figure 5F:
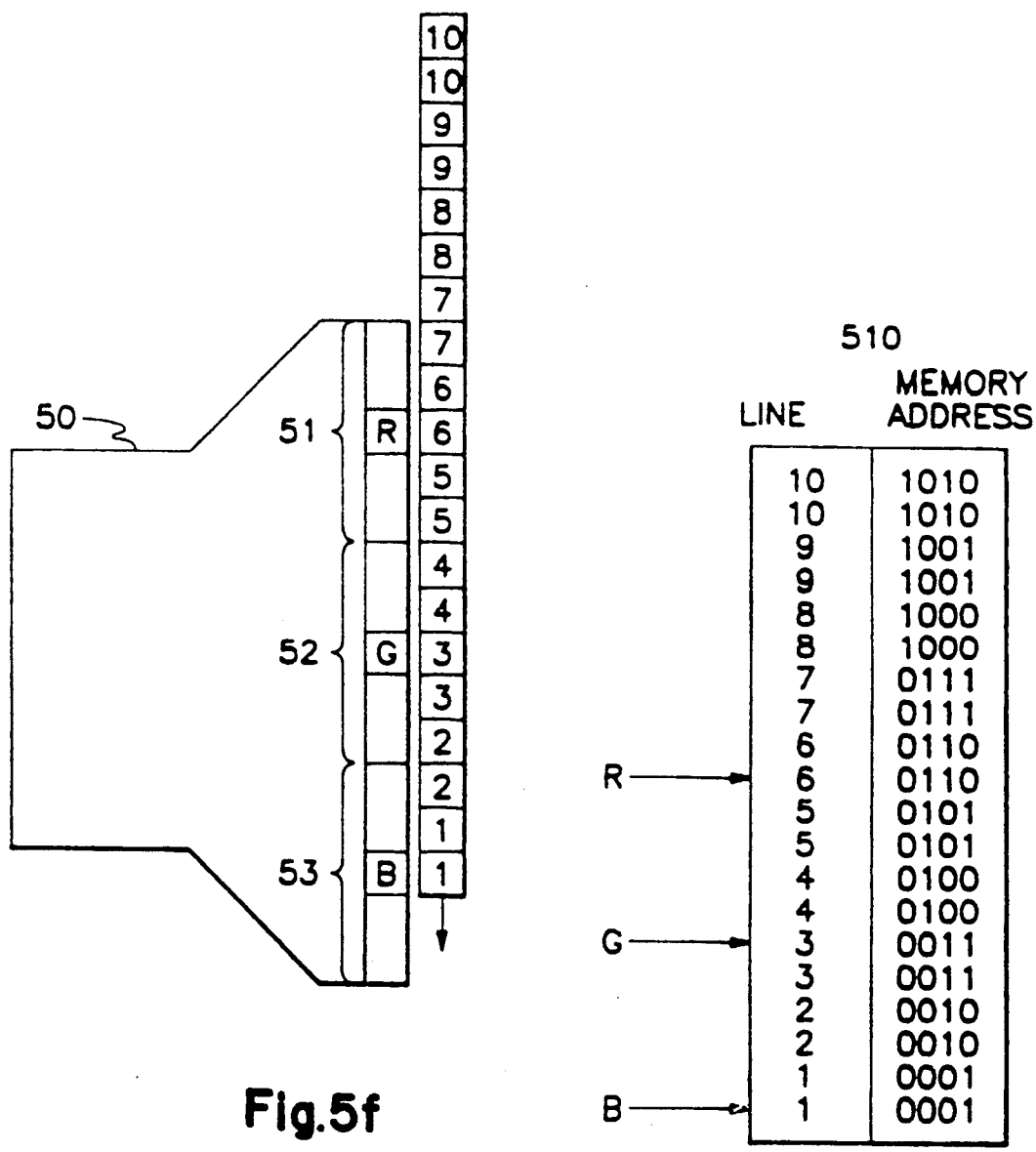

In FIG. 5f, the sheet has been advanced so that the R, G and B tracks now are adjacent to a portion of the sheet. Note that both the R and G pointers have moved due to the latest movement of the reproduction medium. Also, the B pointer has now appeared. During the next set of sweeps of the CRT, the R track will be swept by the electron beam which is modulated by the pixel data at address 0110, the G track will be swept by the electron beam which is modulated by the pixel information stored at address 0011 and the B track will be swept by the electron beam which is being modulated by pixel information stored at address 0001.

Figure 5G:
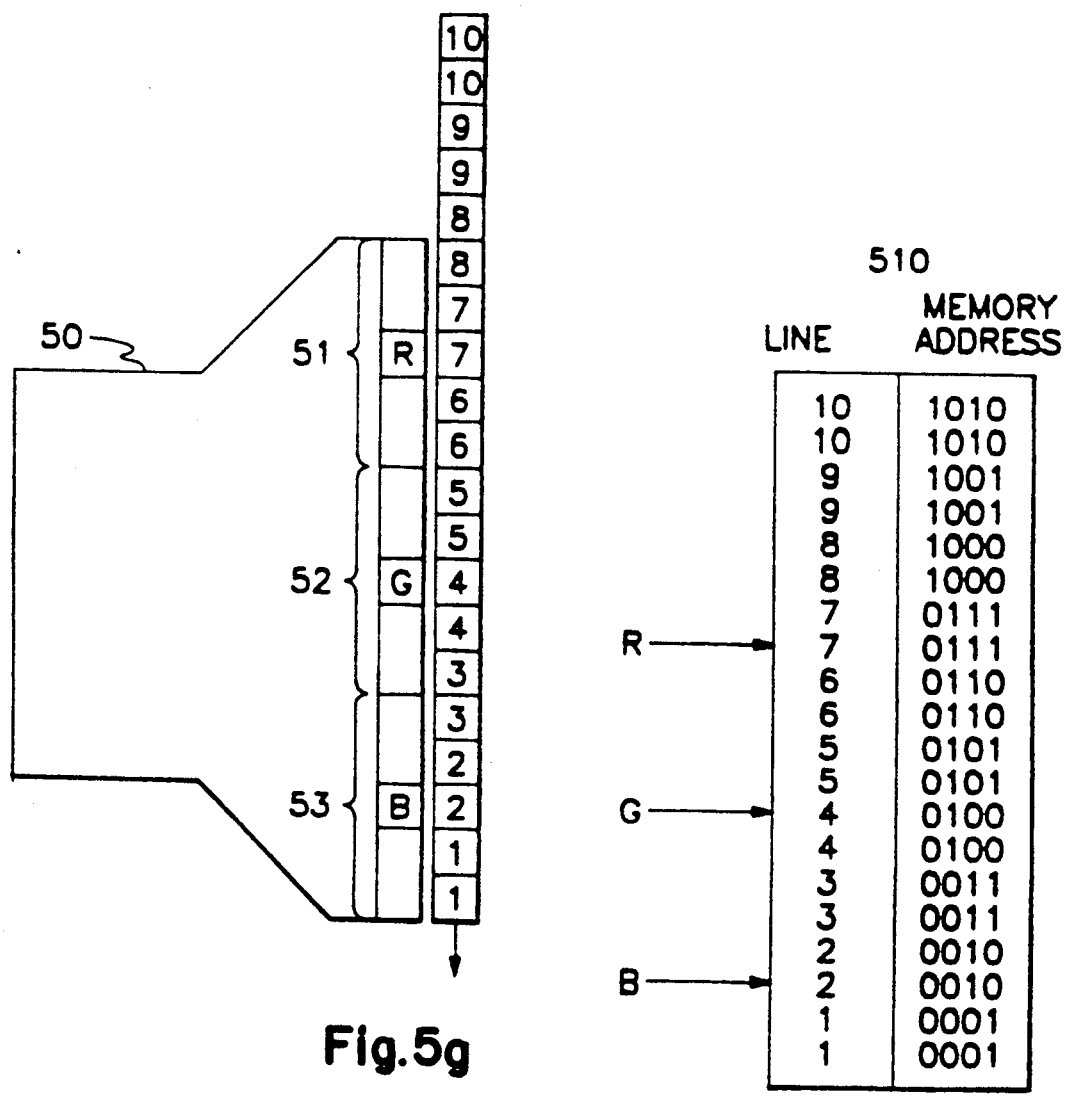

In FIG. 5g, the sheet 500 has been moved so that the two image data lines 1 have moved below the B track. Because line 1 will not be exposed again on the sheet, this image data is no longer needed. This in turn means that a new image data line of the image can be written over image data line 1 in memory 22 at address 0001. In the present example, it is assumed that the capacity of memory 22 is large enough to hold all of the image data lines of the image, but this is not always the case. The inventive system has the capability of printing images with more image data than the memory 22 can handle at one time by overwriting no longer needed image data as was just suggested.

When the graphics microprocessor calls a specific line for printing from memory 22, one of the serial pixel path controller's shift registers makes a copy of the image data stored at the desired location. The shift registers take this image data in parallel, then serially shifts out the data upon command. The serial pixel path controller 25 shifts the pixel data out serially in register with the signal received from frequency divider 75. Note that a single shift register may not have the capacity to hold pixel data for a complete image line. Also, pixel data for a complete image line may be stored such that for example, data for pixels 1–256 are stored at a first series of addresses in first memory buffer 30, data pixels 257–512 are stored at a first series of addresses in second memory buffer 31, data for pixels 513–768 are stored at a second series of addresses in first memory buffer 30, data for pixels 767 to 1024 are stored at a second series of addresses in second memory buffer 31 and so on until data for all of the pixels of a line have been stored.

The alternate loading of the memory buffers is controlled by destination address generator 18 and continues until all of the pixels of a line are stored. During loading, groups of data for 256 pixels can be unloaded as well. In unloading, one shift register is being parallel loaded with pixels while the other shift register is being serially unloaded.

The pixel data shifted out of the shift registers is received by intensity look up table 40. Intensity look up table 40 is a look up table which translates the pixel information into a signal for the CRT. The graphics microprocessor tells the intensity look up table which color component of a line will be printed by using a counter which causes each of the three colors to be selected on every three counts. A two bit signal is assigned to each color. For example, here blue will be 00, green will be 01 and red will be 10. Look up table 40 then will receive signal 00, then 01, then 10 as tracks R, G and B are about to be swept. The intensity look up table then uses the color signal to modify the pixel data to account for being swept on a single color phosphor. Such intensity look up tables are well known in the art.

After the pixel data has been modified by intensity look up table 40, it is then sent to beam intensity modulator 54. Beam intensity modulator 54 includes a digital to analog converter, and produces the signal which is sent to grid G for modulating the electron beam which strikes the phosphors.

A timing means 70, including oscillator 72, first and second frequency dividers 76, provides timing for the system. Oscillator 72 provides the base timing signal for the entire machine. Graphics microprocessor 10 and first and second frequency dividers 75, 80 all receive the constant frequency signal provided by oscillator 72.

Figure 3A:
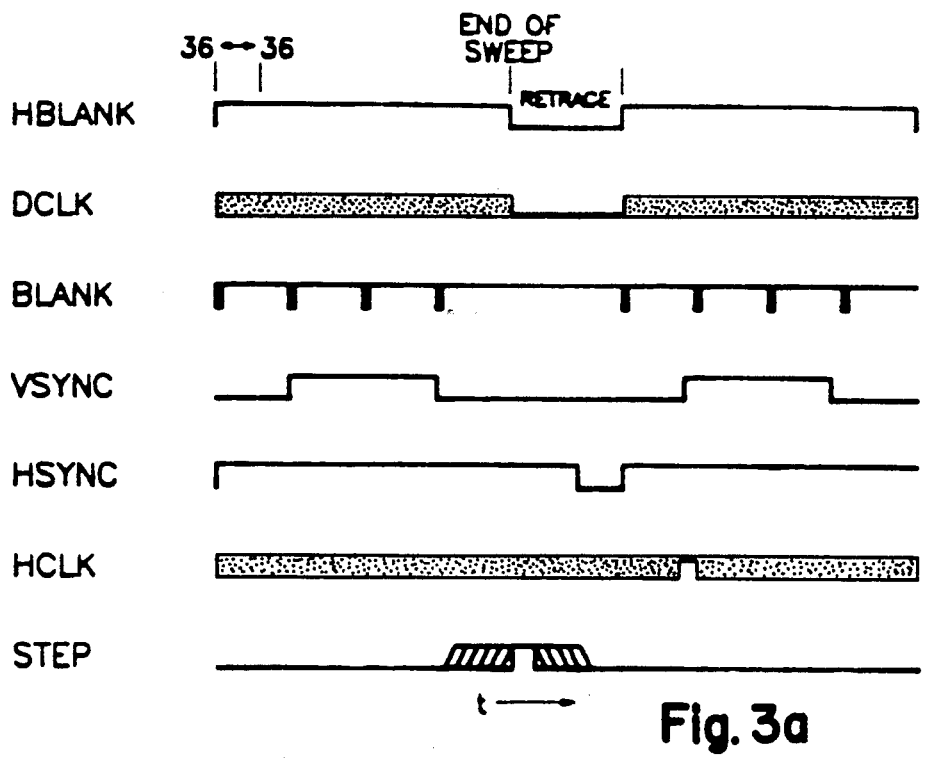
FIGS. 3a and b are timing diagrams of selected signals used in the present system.
Figure 3B:
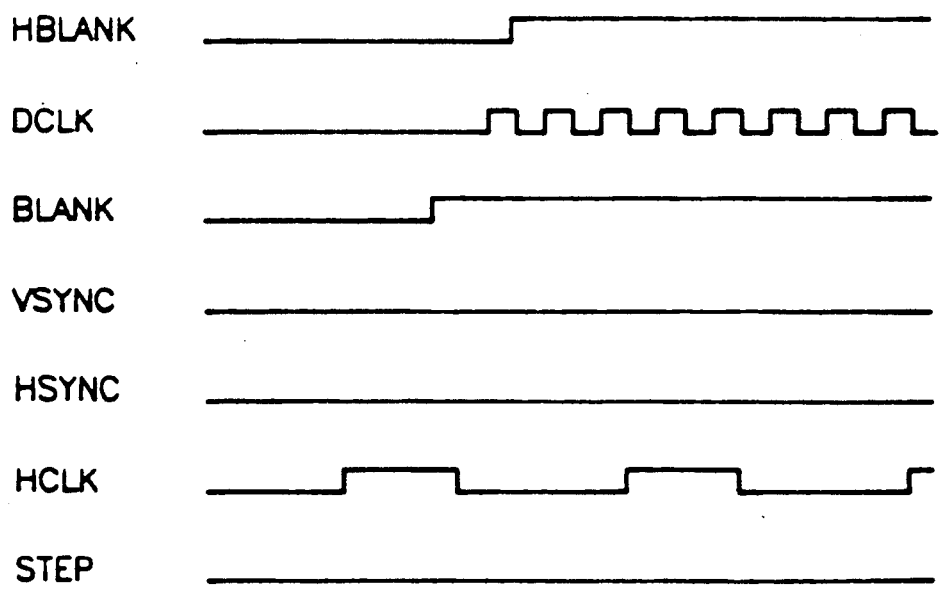

In the following description, FIG. 3b is a blow up of a portion of FIG. 3a taken along lines 3b–3b. First frequency divider 70 produces a first frequency divided signal, (HCLK) as shown in FIGS. 3a and b, which causes serial pixel path controller to shift pixel signals out to the CRT. The first frequency divider 75 receives as inputs the constant frequency signal and a first constant signal produced by the graphics microprocessor 10. The first constant signal, m, is defined as $$m = \frac{F_1 t}{P}$$

where t = time for horizontal sweep, P = number of pixels in a full image line and $F_1$ is the frequency of the constant frequency signal. For each image being printed, a new m can be calculated. Once m is calculated, the constant frequency signal is frequency divided by the first constant signal to produce the first frequency divided signal.

Second frequency divider 76 produces a second frequency divided signal, HCLK as shown in FIGS. 3a and b, which is then sent to the horizontal beam deflection control at yoke 55. The second frequency divider 80 receives as inputs the constant frequency signal and a second constant signal. The second constant signal, n, is calculated from the equation $$n = \frac{F_1 t}{s}$$

where $F_1$ = frequency of the constant frequency signal, t = time for horizontal sweep and s = the number of horizontal steps. Once calculated, the second frequency divided signal determines the length in time of each step of the horizontal sweep. This length can vary from image to image since n is recalculated for each new image being printed. Because the period length can be varied, the system is capable of producing a variable resolution image.

The algorithm for calculating m and n is stored in ROM 90 for retrieval and use by the graphics microprocessor.

Timing of various functions performed by the system is important. The graphics microprocessor 10 produces a number of signals which may be used throughout the system. Four of these signals are vertical synchronization (VSYNC), Horizontal Synchronization (HSYNC), Blanking (BLANK) and STEP.

These signals are depicted in FIGS. 3a and b. The VSYNC signal in systems which have many lines per frame identifies the start of a new video frame. In the present invention, the VSYNC signal is used to identify the occurrence of an event internal to the graphics microprocessor known as a display interrupt. The display interrupt typically occurs in prior art systems when a horizontal retrace interval is about to begin. The horizontal retrace interval generally occurs after the last pixel in a line has been displayed. Here, after a sweep of a display area, a display interrupt occurs. During the display interrupt, a number of functions must be performed by the graphics microprocessor. DMAC 20 occasionally interferes with processing performed by graphics microprocessor 10. During the display interrupt, it is desirable that DMAC activity cease. By providing the VSYNC signal to DMAC 20, it is possible to disable the DMAC from operating during the display interrupt. This allows the graphics microprocessor to perform its time critical functions without interruptions.

The display interrupt also signals that a display area has been swept. It is desirable that the paper be moved at this point. Consequently, a STEP signal is provided to the stepper motor 60 during the display interrupt so that the paper may be moved in register with the image that is produced on the CRT screen. The step signal may occur anytime between the end of one sweep and the beginning of the next sweep as is shown in FIG. 3a. In the preferred embodiment, a buffer 65 is placed between the stepper motor and the graphics microprocessor. On occasion, the CRT will not have finished displaying pixels when the display interrupt occurs. The buffer 65 receives the step signal and holds it until the HSYNC signal is received by the buffer. The buffer then sends the step signal on to the stepper motor.

The BLANK signal in prior art systems was used to blank the CRT beam during the horizontal retrace back to the beginning of the sweep. In the present invention, the BLANK signal is used to control the logic which alternates the unloading of pixel data between banks of RAMS. As was described above, pixel data is loaded into memory buffers 30, 31 by alternating which buffer is to receive pixels. Unloading can occur concurrently with loading. The graphics microprocessor initially selects a buffer to begin unloading pixel data. The shift registers then copy the pixel data for the selected line. Serial pixel path controller then starts shifting the pixel data out to intensity look up table 40, serially. Once one shift register has sent its group of 256 pixels through to the intensity look up table 40, the BLANK signal switches so that the other shift register can send its pixels through to the intensity look up table. While the second shift register sends pixels 257 through 572 to intensity look up table 40, the first buffer is receiving pixels 513-768. This process also continues so that the shift registers continue to alternate shifting out pixels until all of the pixels of a line have been sent to intensity look up table. The BLANK signal is programmable to any length shift register. Here it is set to 256 pixels.

In addition to the above listed signals, the graphics microprocessor performs certain functions. A SCREEN REFRESH function has been used in the prior art to update the video shift registers during the horizontal retrace interval for the next horizontal line. Generally, a SCREEN REFRESH function occurs after all of the pixels in a line have been sent to the CRT. Here, because of the architecture of the memory the SCREEN REFRESH function is programmed to occur after 256 pixels have been transferred to the intensity look up table.

Because the BLANK signal of the graphics microprocessor 10 is being used for other purposes, an external counter 45 which produces a HBLANK signal is provided so that once a complete line of pixel data has been presented to CRT 50, the CRT will receive a horizontal blanking signal during its horizontal retrace period.

Two of the signals shown in FIG. 3a and b are produced by timing means 72. Those signals are DCLK and HCLK. DCLK controls the timing of the release of pixels from serial pixel path controller 25. In FIG. 3a, the scale is too small to pick up the changes in state of DCLK. In FIG. 3b, the scale has been increased and only a portion of the time shown on FIG. 3a is being considered. As can be seen from FIG. 3b, DCLK oscillates many times during each sweep. Each cycle of DCLK represents the release of a pixel signal to the beam intensity modulator 54 for CRT 50. DCLK is calculated by dividing the constant frequency signal F, by constant M which results in $$DCLK = \frac{p}{t}.$$

HCLK is used to step the electron beam across the face of one of the display areas during a sweep by the electron beam. Each sweep has a preselected number of steps. Once again, the scale is too small to show the oscillations of HCLK in FIG. 3a. In FIG. 3b, the oscillations of HCLK are shown. As was stated earlier, resolution and size are varied by changing the relationship between HCLK and DCLK. Note that in this example, three pixels are released for each horizontal step of the electron beam. This relationship must be maintained throughout the printing of one image to prevent distortion. However, the relationship may change if distortion is desirable, or the relationship may change from image to image depending upon the amount of image data in an image, the size of the desired image or the resolution which is selected. HCLK is calculated by dividing constant frequency signal $F_1$ by constant n which results in $$HCLK = \frac{s}{t}.$$

The foregoing has been a description of the inventive facsimile apparatus. The applicant does not intend that the coverage be limited to the specific systems described in the specification but instead intends to be limited only by the claims appended hereto.

I claim:

1. The method of producing an output image on a cathode ray tube for transfer to a photo sensitive recording medium, comprising the steps of:
   determining the dimensions of said output image in pixels and lines;
   receiving the pixel information from an image source;
   storing said pixel information;
   calculating a first pixel rate for the transfer of said pixel information to said cathode ray tube;
   calculating a second rate for the horizontal sweeping of said cathode ray tube electron beam;
   transferring said pixel information to said cathode ray tube at said first rate; and
   deflecting horizontally said electron beam of said cathode ray tube at said calculated second rate.

2. The method of printing an output image on a sensitized surface, from input image source data, said output image having a first preselected dimension in pixels and a second preselected dimension in lines, comprising the steps of:
   selecting a size for said printed output image;
   selecting a resolution for said printed output image;
   determining the dimensions of printed output image from said input image source data;
   generating a first frequency signal as a function of said first preselected dimension;
   generating a second frequency signal as a second function of said second preselected dimension;
   modulating an electron beam from a cathode ray tube by releasing image data to an electron beam modulator of a cathode ray tube in register with said first clock signal;
   horizontally deflecting said electron beam in register with said second clock signal.

3. The method of claim 2, comprising the further step of:

moving a said sensitized medium past a plurality of display areas of said cathode ray tube in register with movement of a portion of said output image across said display areas.

4. A system for producing on a sensitized surface an image of selectable size and resolution formed from an array of parallel lines of pixels, comprising:
 timing means adapted to produce first and second signals whose frequencies vary separately as functions of the selected size and resolution;
 memory means connected to receive the first signal from said timing means, said memory means being adapted to store pixel signals representing characteristics of individual pixels, and to release said pixel signals at a rate determined by said first pixel; and
 image exposure means operable in response to an intensity control signal to produced at a specified location on said sensitized surface an output to which the sensitized surface is sensitive, said image exposure means further being operable in response to a position control signal to vary the specified location along a first direction;
 an intensity modulator connected to said memory means and said image exposure means, said intensity modulator producing the intensity control signal for said image exposure means in response to the pixel signals released by said memory means;
 medium transport means for moving said sensitized surface past the area on said image exposure means at which the output thereof is produced along a second direction transverse to the first direction.

5. Apparatus for generating an output image on a photosensitive image recording media, from input source image data, said output image being expressed as a set of lines of pixels, said apparatus comprising:
 pixel storage means (22) for storing pixel data;
 exposure means (50), coupled to said pixel storage means (22) having a plurality of exposure areas for writing a line of pixel data onto said photosensitive image recording media (80);
 media transport means (60) for transporting and locating said photosensitive media (80) proximate said exposure means (50);
 exposure clock means (76) coupled to said exposure means (50) for determining an exposure write rate at said exposure area, one line of pixel data being written in one write cycle;
 pixel clock means (75), coupled to said pixel storage means (22), for determining the rate at which pixel data is delivered to said exposure means (50) during each of said write cycles;
 said exposure clock means (76) and said pixel data clock means (75) together forming means for determining the size of a pixel in a first dimension;
 exposure data selection means (55) coupled to said pixel storage means (22) for addressing and directing pixel data to one of said plurality of exposure area, during each of said write cycles.

6. The apparatus of claim 5 wherein said exposure means comprises:
 a cathode ray tube, having a plurality of separate phosphor bands defining said exposure areas.

7. The apparatus of claim 5 wherein said exposure means comprises:
 a cathode ray tube having a phosphor band, and having a plurality of exposure areas defined in each of said phosphor bands.

8. The apparatus of claim 5, wherein said exposure means comprises:
 a cathode ray tube having red green and blue phosphor bands and having a plurality of exposure areas defined in each of said phosphor bands.

9. Apparatus for generating an output image on a photosensitive image recording media, from input source image data, said output image being expressed as a set of lines of pixels, said apparatus comprising:
 pixel storage means for storing pixel data;
 exposure means, coupled to said pixel storage means (22) having a plurality of exposure areas for writing a line of pixel data onto said photosensitive image recording media;
 media transport means for transporting and locating said photosensitive media proximate said exposure means;
 exposure clock means coupled to said exposure means for determining an exposure write rate at said exposure area, one line of pixel data being written in one write cycle;
 pixel clock means coupled to said pixel storage means for determining the rate at which pixel data is delivered to said exposure means during each of said write cycles;
 said exposure clock means and said pixel data clock means together forming means for determining the size of a pixel in a first dimension;
 exposure station selection means coupled to said pixel storage means for addressing and directing pixel data to different ones of said plurality of exposure areas during each of said write cycles;
 whereby, said means for determining the size of said pixel, and said exposure station selection means together scale said output image, by repeating lines of pixels in arbitrarily selected positions in said output image, independently of the width of a pixel.

* * * * *

UNITED STATES PATENT AND TRADEMARK OFFICE
CERTIFICATE OF CORRECTION

PATENT NO.  : 5,165,073

DATED       : November 17, 1992

INVENTOR(S) : Kerry L. Shaklee et al.

It is certified that error appears in the above-identified patent and that said Letters Patent is hereby corrected as shown below:

In column 2, line 7, please delete "FIG." and insert therefor --FIGS.--

In column 2, line 28, after the word "Finally,", please delete "a"

In column 2, line 28, after the word "section", please insert
   --86 of reproduction medium 80 includes one or more lines--

In column 4, line 31, please delete the word "stores" and insert
   therefor --stored--

In column 7, line 57, after the word "dividers", please insert --75,--

In column 7, line 60, please delete "80" and substitute therefor --76--

In column 7, line 64, please delete "70" and substitute therefor --75--

In column 8, line 18, please delete "80" and substitute therefor --76--

In column 11, line 19, in claim 4, please delete the word "produced"
   and substitute therefor --produce--

Signed and Sealed this

First Day of February, 1994

Attest:

BRUCE LEHMAN

Attesting Officer

Commissioner of Patents and Trademarks